H. D. DARGERT.
MOTOR PROPELLED VEHICLE.
APPLICATION FILED MAY 12, 1919.

1,405,763.

Patented Feb. 7, 1922.

INVENTOR.
Henry D. Dargert,
By Wilhelm & Parker,
ATTORNEYS.

UNITED STATES PATENT OFFICE.

HENRY D. DARGERT, OF BUFFALO, NEW YORK.

MOTOR-PROPELLED VEHICLE.

1,405,763.  Specification of Letters Patent.  Patented Feb. 7, 1922.

Application filed May 12, 1919. Serial No. 296,382.

*To all whom it may concern:*

Be it known that I, HENRY D. DARGERT, a citizen of the United States, residing at Buffalo, in the county of Erie and State of New York, have invented a new and useful Improvement in Motor-Propelled Vehicles, of which the following is a specification.

This invention relates to improvements in the frame construction and driving connections of motor vehicles, more particularly of the commercial kind, such as tractors, trucks or the like.

The objects of the invention are to produce a chassis of improved construction in which the driving wheels are driven by gears connected with the motor in such a manner as to permit of the use of springs between the driving wheels and the frame; also to provide a construction of this kind in which the proper meshing of the gears mounted on the driving wheels and the pinions therefor is insured at all times; also to provide a construction of this kind which is efficient in operation and inexpensive to manufacture; also to improve the construction of devices of this kind in other respects hereinafter specified.

Figure 1:
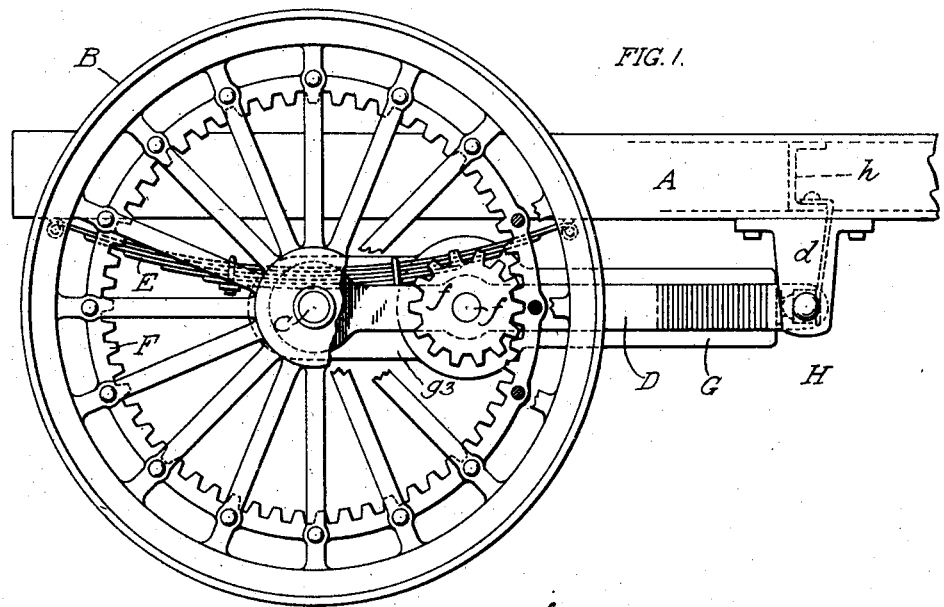
Fig. 1 is a fragmentary side elevation of a vehicle showing the mechanism embodying the invention.
Figure 2:
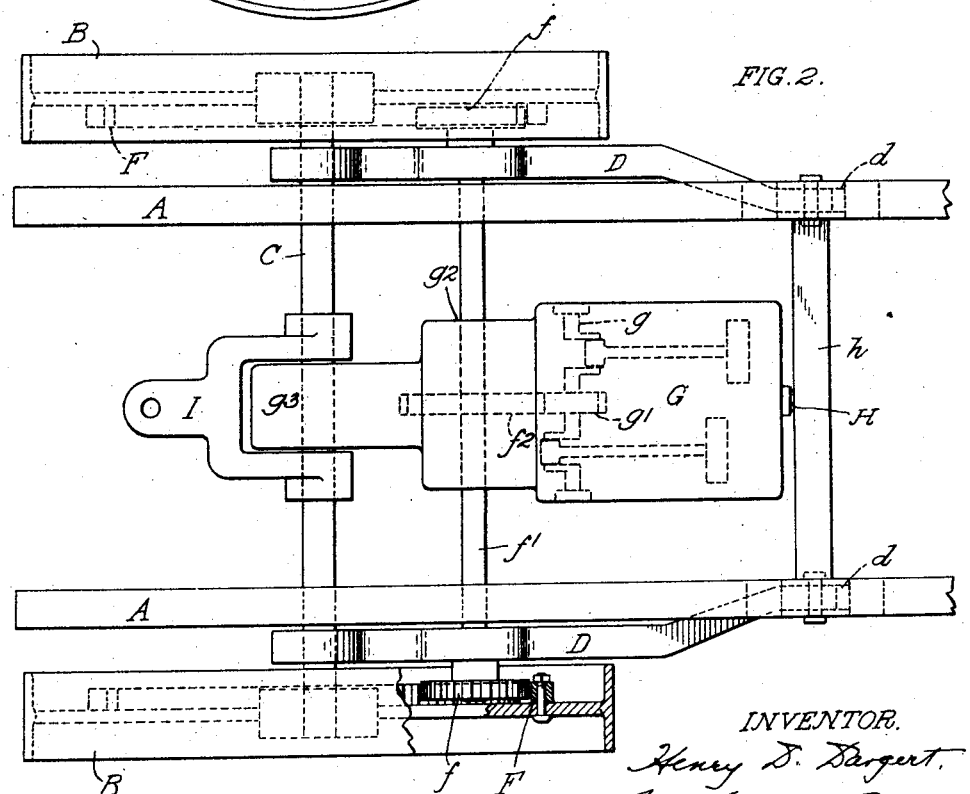
Fig. 2 is a top plan view thereof.

A A represent the usual longitudinal side frame members of a vehicle and B B the rear or driving wheels thereof which are journaled on a fixed axle C which is preferably of unitary or one-piece construction. All of these parts may be of any usual or suitable construction.

The axle C is secured on an auxiliary or sub-frame which comprises side parts or members D, each of which is secured at one end, at the front end in the construction shown, to the main frame A, which is preferably provided with depending parts or brackets $d$ to which the front ends of the side members D are pivotally secured. The other ends of the side members are connected to the main frame by means of springs E, which are secured to the main frame and to the axle C or side parts D in any suitable or desired manner so that the auxiliary or sub-frame and the wheels B may move relatively to the main frame of the vehicle about the pivotal connection of the auxiliary frame with the brackets $d$.

The wheels B are driven by means of gears F, internal gears being shown in the construction illustrated, which are secured to the wheels and which engage with pinions $f$ which are secured to a shaft $f'$ which is suitably journaled in the auxiliary frame D. This shaft, in the construction shown, receives its rotary movement from a differential gear $f^2$ which may be of any suitable or desired construction. By arranging the axle C and the shaft $f'$ on the side members D of the auxiliary frame, the axial distance between the axle and driving shaft $f'$ remains fixed at all times regardless of movements of the wheels relatively to the frame, so that the pinions $f$ will always remain in proper mesh with the gears F. This arrangement also causes the wheels B to move relatively to the vehicle frame about the pivotal connection of the frame members D with the main frame of the vehicle. The side members D of the auxiliary frame, together with the axle C and shaft $f'$ and the pivotal connections of the side members D with the brackets $d$, form a substantially rigid frame structure which holds the wheels B and the pinions F in fixed relationship to each other so as to insure at all times a perfect meshing of the pinions with the gears F. The rigidity of the auxiliary frame prevents the twisting or movement of the parts of the auxiliary frame relatively to each other so that these parts move only about the pivotal connection of the auxiliary frame with the main frame, and during this movement the pinions $f$ and gears F remain in mesh.

Power may be transmitted to the differential gear $f^2$ in any suitable manner. In the construction shown, a driving motor G is provided having a crank shaft $g$ on which a gear $g'$ is mounted which drives the differential. The motor is preferably partly supported on the auxiliary frame and partly on the main frame and is provided with a journal or bearing $g^2$ on the shaft $f'$ by means of which the engine is secured on the auxiliary frame. The engine frame preferably is also provided with an extension $g^3$ through which the axle C extends and which forms an additional support for the engine and also serves to stiffen the auxiliary frame to resist the twisting or bending thereof. At the front end the engine is preferably connected to a cross member $h$ suitably secured to the main frame, a flexible connection H of any suitable kind, such as a universal joint, or the like, being preferably employed. The driving motor may, however, be arranged in any other part of the vehicle and may be connected to the differential gear $f^2$ by any desired means. Other means for transmitting power from the motor to the shaft $f'$ may be provided if desired.

The vehicle is provided on the auxiliary frame with a drawbar I of any suitable construction, that shown being mounted on the rear axle C, so that the draft strains are transmitted directly through the rigid rear axle and do not pass through the main frame. By mounting the engine or other source of power directly on the auxiliary frame as shown, the strains are all confined to the auxiliary frame, so that the connection between the auxiliary and main frame need not be made any stronger than necessary to support the weight of the parts. In this manner the power from the engine is directly and efficiently transmitted from the engine to the object or objects which are drawn.

The auxiliary frame is preferably so constructed that all the bearings for the wheels, pinions and pivotal connection with the main frame lie in the same plane. This also ensures the proper alinement and meshing of the driving gears in all positions of the auxiliary frame.

The construction described overcomes to a large extent the tendency of tractors of this kind to upset themselves rearwardly when exerting too great a pull. This is done partly by arranging the draw-bar on the main axle or sub-frame and not on the main frame of the tractor. When the pull exerted by the tractor is excessively hard, the sub-frame D swings about its pivot in a direction to swing the outer end of the sub-frame away from the main frame, thus lifting the rear part of the main frame instead of tending to turn the main frame over backwardly. Consequently when a tractor provided with the structure shown pulls an excessively heavy load, the sub-frame tends to first raise the rear portion of the main frame which increases the weight on the traction wheels, thus greatly increasing the tractive effort thereof and making it possible for the tractor to exert a draw-bar pull considerably greater than the weight of the tractor. The sub-frame and spring construction thus greatly increase the power which the tractor is capable of developing. The fact that an excessively hard pull tends to raise the rear of the main frame also acts as a warning to the operator that the tractor has exerted nearly its greatest pull.

The frame construction and driving connections described are extremely simple to construct and make it possible to employ a gear drive in connection with a vehicle of this kind and at the same time make it possible to use springs between the driving wheels and the vehicle frame. The construction is such that the gearing remains at all times in proper mesh regardless of the relative positions of the driving wheels and the vehicle frame.

I claim as my invention:

1. In a motor vehicle, the combination with a main frame, of a substantially rigid auxiliary frame having a hinged connection at one end thereof with said main frame and adapted to swing relatively to said main frame only about the axis of said hinged connection, a spring connection between the other end of said auxiliary frame and said main frame, driving wheels mounted on said auxiliary frame, and gearing on said wheels and on said auxiliary frame through which said wheels are driven, said hinged connection forming the only driving connection between said auxiliary and main frames, whereby all of the tractive efforts of said driving wheels are transmitted to said main frame through said hinged connection.

2. In a motor vehicle, the combination with a main frame, of a substantially rigid auxiliary frame pivotally connected at one end with said main frame and comprising two side members, each of which is pivoted at one end on said main frame whereby said auxiliary frame swings about said main frame only about the axis of said pivotal connections, a spring connection between the other end of said auxiliary frame and said main frame, driving wheels mounted on said other end of said auxiliary frame, pinions mounted on said auxiliary frame, and gears mounted on said wheels and engaged by said pinions.

3. In a motor vehicle, the combination with a main frame, of a substantially rigid auxiliary frame having a hinged connection at one end thereof with said main frame and adapted to swing relatively to said main frame only about the axis of said hinged connection, a spring connection between the other end of said auxiliary frame and said main frame, driving wheels mounted on said auxiliary frame, gearing on said wheels and on said auxiliary frame through which said wheels are driven, said hinged connection forming the only driving connection between said auxiliary and main frames, whereby all the tractive efforts of said driving wheels are transmitted to said main frame through said hinged connection, and a drawbar on said auxiliary frame.

4. In a motor vehicle, the combination with a main frame, of a substantially rigid auxiliary frame having a hinged connection at one end thereof with said main frame and adapted to swing relatively to said main frame only about the axis of said hinged connection, a spring connection between the other end of said auxiliary frame and said main frame, driving mechanism including gearing and a motor arranged on said auxiliary frame, and a drawbar connected with said auxiliary frame.

5. In a motor vehicle, the combination with a main frame, of an auxiliary frame pivotally connected at one end with said main frame, an axle rigidly secured in the other end of said auxiliary frame, driving wheels mounted on said axle, a spring connection between said auxiliary frame and said main frame, gearing on said wheels and on said auxiliary frame through which said wheels are driven, and a motor for driving said vehicle which is partly supported on said auxiliary frame and partly supported on said main frame.

6. In a motor vehicle, the combination with a main frame, of an auxiliary frame pivotally connected at one end with said main frame, an axle in the other end of said auxiliary frame, driving wheels mounted on said axle, a spring connection between said auxiliary frame and said main frame, gearing on said wheels and on said auxiliary frame through which said wheels are driven, and a motor for driving said vehicle which is partly supported on said auxiliary frame and which has a flexible connection with said main frame.

7. In a motor vehicle, the combination with a main frame, of an auxiliary frame pivotally connected at one end with said main frame, and comprising two side members, each of which is pivoted at one end on said main frame, a spring connection between the other end of said auxiliary frame and said main frame, driving wheels mounted on said other end of said auxiliary frame, pinions mounted on said auxiliary frame, gears mounted on said wheels and engaged by said pinions, and a motor for driving said vehicle which is partly supported on said pinion shaft.

8. In a motor vehicle, the combination with a main frame, of an auxiliary frame pivotally connected at one end with said main frame and comprising two side members, each of which is pivoted at one end on said main frame, a spring connection between the other end of said auxiliary frame and said main frame, an axle connecting the other ends of said side members, driving wheels pivoted on said axle, gears mounted on said driving wheels, pinions meshing with said gears, a pinion shaft journaled in said auxiliary frame intermediate of the ends thereof, and a motor for driving said vehicle which is partly supported on said pinion shaft and which has an extension connected with said axle.

9. In a motor vehicle, the combination with a main frame, of an auxiliary frame pivotally connected at one end with said main frame, an axle rigidly secured in the other end of said auxiliary frame, driving wheels mounted on said axle, a spring connection between said auxiliary frame and said main frame, gearing on said wheels and on said auxiliary frame through which said wheels are driven, a motor for driving said vehicle which is partly supported on said auxiliary frame and partly supported on said main frame, and a drawbar arranged on said auxiliary frame.

10. In a motor vehicle, the combination with a main frame, of a substantially rigid auxiliary frame pivotally connected at one end with said main frame, an axle in the other end of said auxiliary frame, driving wheels mounted on said axle, a spring connection between said auxiliary frame and said main frame, gearing on said wheels and on said auxiliary frame through which said wheels are driven, and a drawbar arranged in said axle.

11. In a motor vehicle, the combination with a main frame, of an auxiliary frame pivotally connected at one end with said main frame, an axle in the other end of said auxiliary frame, driving wheels mounted on said axle, gears on said driving wheels, pinions journaled in said auxiliary frame and meshing with said gears, a shaft for driving said pinions, a motor for driving said shaft and having a part secured on said axle for supporting the motor on said auxiliary frame, and a drawbar secured on said axle.

Witness my hand, this 8th day of May, 1919.

HENRY D. DARGERT.

Witnesses:
M. J. PITMAN,
H. L. McGEE.